FIGURE 4

CALCULATED EFFECT OF $SiO_2/Al_2O_3$ RATIO ON UNIT CELL SIZE

Si-O BOND = 1.61 Å   Si   110°   Al
Al-O BOND = 1.70 Å            O

FIGURE 5
INFRARED SPECTRA OF ACID FAUJASITES

| RUN NO. | SAMPLE DESCRIPTION | TEMP., °F. |
|---|---|---|
| 47C | 18.9 MG./CM. DISK OF $[(NH_4)_{0.92}Na_{0.08}]$ Y AFTER EVAC. AT 800°F. | 800 |
| 77B | 12.6 MG./CM. DISK OF $[(NH_4)_{0.72}Na_{0.28}]$ Y AFTER STEAMING AT 1200°F. | 800 |

FIGURE 7

INFRARED SPECTRA OF ACID FAUJASITES AFTER STEAMING

United States Patent Office 3,506,400
Patented Apr. 14, 1970

3,506,400
HIGH SILICA CRYSTALLINE ZEOLITES AND PROCESS FOR THEIR PREPARATION
Paul Earl Eberly, Jr., Baton Rouge, Sebastian Marc Laurent, Greenwell Springs, and Harry Edwin Robson, Baton Rouge, La., assignors to Esso Research and Engineering Company, a corporation of Delaware
Filed May 25, 1966, Ser. No. 552,911
Int. Cl. C01b 33/28
U.S. Cl. 23—182
11 Claims

ABSTRACT OF THE DISCLOSURE

Crystalline aluminosilicate zeolites having silica to alumina mole ratios substantially higher than prior art zeolites are prepared by a process wherein a conventional crystalline aluminosilicate zeolite is contacted with water at an elevated temperature and then treated to remove alumina from the crystal lattice. The water treatment can be accomplished by contacting the crystalline aluminosilicate zeolite with a gas containing at least 2% water at a temperature between 800 and 1500° F. Higher concentrations of water are preferred, and, in accordance with the disclosure, pure steam may be used. In a preferred embodiment, the water treatment is accomplished in two steps; viz, by first treating the crystalline zeolite with a gas containing at least 2% water, followed by treatment with pure steam. Following the water treatment, amorphous alumina is removed from the zeolite material by contacting with a dilute mineral acid or an organic acid chelating agent.

---

The present invention relates to new compositions of matter consisting of crystalline aluminosilicate zeolites of the molecular sieve type having silica to alumina mole ratios very substantially higher than has heretofore been obtainable. More specifically, the present invention involves a process whereby crystalline aluminosilicate zeolites of the molecular sieve type are subjected to a heat treatment in the critical presence of water to effectuate removal of a substantial portion of alumina from the zeolite crystal structure thereby resulting in a high silica content crystalline zeolite molecular sieve. In a further embodiment of the present invention, the amorphous alumina produced by the heat treatment in the presence of water is removed from the crystalline zeolite structure by means of extraction with a leaching or complexing agent selective to alumina.

Crystalline aluminosilicate zeolites, commonly referred to as "molecular sieves," are now well known in the art. They are characterized by their highly ordered crystalline structure and uniformly dimensioned pores, and are distinguishable from each other on the basis of composition, crystal structure, adsorption properties, and the like. The term "molecular sieve" is derived from the ability of the zeolite materials to selectively adsorb molecules on the basis of the molecular size and form. The various types of molecular sieves may be classified according to the size of the molecules which will be rejected (i.e., not adsorbed) by a particular sieve. A number of these zeolite materials are described, for example, in U.S. Patents 3,013,982–86 wherein they are characterized by their composition and X-ray diffraction characteristics. In addition to their extensive use as adsorbents for hydrocarbon separation processes and the like, it has recently been found that crystalline aluminosilicate zeolites, particularly after cation exchange to reduce alkali metal oxide content, are valuable catalytic materials for various processes, particularly hydrocarbon conversion processes.

In general, the chemical formula of anhydrous crystalline aluminosilicate zeolites expressed in terms of moles may be generally represented as:

wherein M is a metal cation, generally sodium or potassium as found in the natural form or when synthesized; $n$ is the valence of the metal cation; and X is a number from about 1.5 to about 12, said value being dependent upon the particular type of zeolite. Included among the well-known natural zeolites are mordenite, faujasite, chabazite, gmelinite, analcite, erionite, etc. Such zeolites differ in structure, composition and particularly in the ratio of silica to alumina contained in the crystal lattice structure. Similarly, the various types of synthetic crystalline zeolites, e.g., synthetic faujasite, mordenite, zeolite Y, etc., will also have varying silica to alumina ratios depending upon such variables as composition of the crystallization mixture, reaction conditions, etc.

It has been found that for general catalytic or adsorptive uses, the aluminosilicate zeolites having higher silica to alumina ratios will be preferred due to their higher stability. Generally speaking, the higher the silica-alumina ratio in an aluminosilicate, the greater the stability to heat, steam and acid. This is true not only between different crystalline types of zeolites, e.g., mordenite having a silica to alumina mole ratio in the range between 8/1 to 12/1 generally exhibits better stability to acid than faujasite having a silica to alumina mole ratio in the range between 3/1 to 6/1, but additionally in compositions of the same crystalline type such as, for example, a faujasite having a silica to alumina mole ratio of about 6/1 generally exhibits greater steam stability than a faujasite having a silica to alumina mole ratio of about 3.5/1. Loss of stability in crystalline aluminosilicate zeolites of the molecular sieve type is generally exhibited by a lowering of the order of crystallinity of the material. Such reduction in the degree of crystallinity in an aluminosilicate zeolite molecular sieve will in turn adversely affect the desirable characteristics of catalytic activity or adsorptivity of such materials. It is obvious, therefore, that any process which would enhance a crystalline aluminosilicate zeolite molecular sieve's resistance to degradation of crystallinity or which would form a molecular sieve of a higher order of crystallinity than was previously obtainable would be highly desirable.

In synthetic crystalline aluminosilicate zeolite molecular sieves, the silica/alumina mole ratio is essentially determined by the nature of the starting materials and the relative quantities of such materials used in the preparation of the zeolite. Some variation in the silica/alumina ratio can be obtained by changing the proportion of reactants, i.e., increasing the relative concentration of the silica precursor relative to the alumina precursor. However, definite limits in the maximum obtainable silica/alumina mole ratio are observed. For example, synthetic faujasites having a silica to alumina mole ratio of about 5.2 to 5.6 can be obtained by increasing the relative proportion of silica precursor. However, when the silica proportion is increased to even higher levels no commensurate increase in the silica to alumina mole ratio of the crystallized synthetic faujasite is observed. Thus, the silica to alumina mole ratio of about 5.65 must be considered an upper limit in a preparative process using conventional reagents. Corresponding upper limits in the silica to alumina mole ratio of mordenite and erionite via the synthetic pathway are also observed.

The art has suggested possible methods of increasing the silica to alumina mole ratios of crystalline aluminosilicate zeolite molecular sieves beyond either the synthetic upper limits or that of the naturally occurring material. One procedure disclosed in South African Patent No. 64/472, granted Feb. 3, 1964 to Kerr et al., teaches a process for the selective complexing of alumina from crystalline aluminosilicate zeolites by using a chelating agent such as di(tetraethyl ammonium) dihydrogen ethylene diamine tetraacetic acid or acetate. The acidic chelating agent is utilized both as a medium for providing cation exchange to yield the hydrogen form of the crystalline aluminosilicate zeolite and additionally as a means of removing alumina selectively to produce a zeolite having a higher silica to alumina mole ratio.

A disclosure in a similar vein is to be found in South African Patent No. 65/922, published Feb. 22, 1965, to British Petroleum Company, which patent indicates that mordenite treated with a mineral acid will lose about one atom of aluminum per unit cell of the mordenite crystal lattice. This lost aluminum is believed to be replaced by four hydroxyl groups.

The above methods for increasing the silica to alumina mole ratio in crystalline aluminosilicate zeolites are considered disadvantageous. For example, use of an acid medium to extract or chelate alumina out of crystalline zeolites is generally contraindicated for those zeolites having initial silica to alumina mole ratios less than about 7.0. Such zeolites generally are structurally unstable in the presence of acid and will suffer a large degree of crystal degradation when exposed thereto. Thus, the prior art techniques would generally find applicability only in crystalline zeolites having initially high silica to alumna mole ratio, such as in mordente. If a crystalline zeolite is utilized having a lower silica to alumina mole ratio, it is necessary to employ careful pH control in order to utilize the chelating or acid extraction procedures described above. Such control adds to the expense and reduces the overall efficiency of such a process.

It is, therefore, an object of the present invention to provide a process for the selective removal of alumina from the tetrahedral sites in the crystal lattice of aluminosilicate zeolite molecular sieves. It is a further object of the present invention to provide a process which will increase the silica to alumina mole ratio in crystalline aluminosilicate zeolites to levels unattainable by synthesis or unavailable in the natural material. It is a still further object of the present invention to provide such processes which will operate in such a manner as to retain a high level of crystallinity in the resulting aluminosilicate zeolite so as to not adversely affect the desirable catalytic and adsorptive properties of these materials. Yet another object of the present invention is to provide crystalline aluminosilicate zeolite molecular sieves having substantially enhanced structural stability over those available by practice of current techniques of preparation. A still further object of the present invention is to provide a process for effectively removing virtually all of the alumina tetrahedra in a crystalline aluminosilicate to form as a new composition of matter a pure polysilicate crystalline material which essentially retains the crystal structure of the starting crystalline aluminosilicate. Such crystalline polysilicates having essentially the crystal structure of a molecular sieve are of great interest in catalytic reactions wherein this catalytic activity is not adversely affected by the presence of metal cations since such metal cations are not required in the polysilicate crystal lattice to achieve electrical neutrality.

The essence of the present invention is based upon the discovery that aluminum can be selectively abstracted from the tetrahedral sites in a crystalline aluminosilicate zeolite molecular sieve by heat treating the zeolite for a period of from about 1 to 24 hours, preferably 4 to 16 hours, in the critical presence of water at temperatures in the range of about 800 to 1500° F., preferably 1000 to 1200° F. It is generally desired that at least 2% water be present in the treating gas, preferably at least 5%, and most preferably 25%. In a preferred embodiment of the present invention, the acidic, e.g., hydrogen or hydrogen precursor such as ammonium, form of a crystalline aluminosilicate zeolite is treated with steam for a period of from about 4 to 24 hours, preferably 16 to 24 hours, at a temperature in the range of about 1000 to 1200° F. and a pressure of at least 10 p.s.i.a. to effectuate selective removal of alumina from the crystal lattice. In one embodiment, the zeolite is first wet air calcined at a temperature in the range of about 650 to 1200° F. and then is subjected to steaming as before. The alumina so produced is in an amorphous form and remains within the gross structure of the zeolite. This amorphous alumina may be removed from the zeolite material by appropriate treatment with a dilute mineral acid or an organic acid chelating agent. An unobvious benefit is obtained by utilizing the process steps of the present invention in the order described. For example, by following the process steps of the present invention it is possible to preserve the structural stability and crysallinity of zeolites having relatively low initial silica to alumina mole ratios which zeolites would otherwise be damaged by direct treatment with an acid medium or chelating agent.

The acid zeolites utilized in the practice of the present process are generally obtained by cation exchanging zeolites which are initially in the alkali metal form with ammonium ions (generally as the ammonium salt in aqueous media) by means of any conventional cation exchange technique. For purposes of this invention, it is generally desired that more than 50% and preferably more than 75% of the original metal cations be exchanged with ammonium ion. The ammonium form is subsequently heated to a temperature in the range from about 600 to 1000° F. to produce the acid zeolite.

It has further been found that the structure of the heat treated product as well as its stability depend, to a large extent, on the method of calcination. Time, temperature and water content of the calcining gas all play an important part in this respect. The effect of these variables in the preparation of a zeolite Y having an extremely high silica to alumina mole ratio, e.g., 15 to 1 or greater, is indicated in the following discussion.

The ammonium form of a synthetic faujasite ($NH_4Y$) prepared by ammonium ion exchange of sodium faujasite was heat treated at various temperatures and in the presence or absence of water. It was found that heat treatment in dry air (dew point of $-100°$ F.) gave the same results as heat treatment in vacuum. Under either of these aforementioned conditions, ammonia gas is liberated from the solid leaving behind protons in well-defined hydroxyl groups. These protons satisfy the original charge requirements of the structure and the material can be properly called hydrogen-faujasite.

Figure 1:
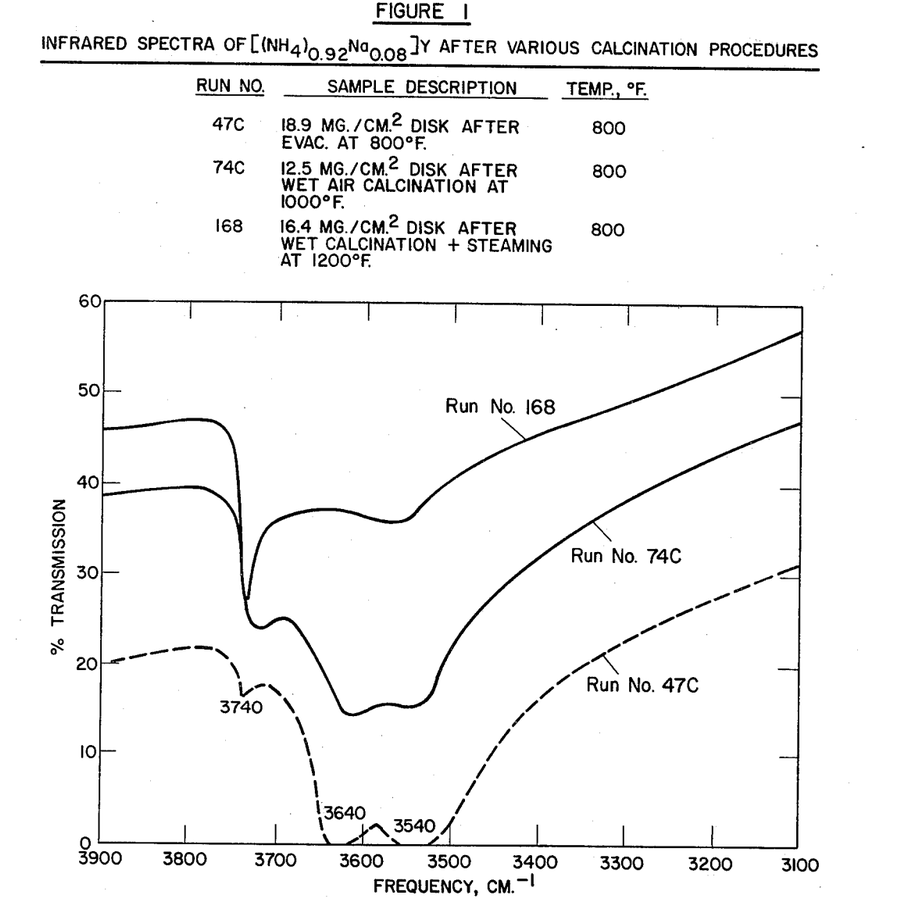

Infrared spectrum of $NH_4Y$ after calcination under vacuum at 800° F. is shown by the bottom curve of FIGURE 1. The —OH groups are characterized by infrared bands at 3740, 3640 and 3550 cm.$^{-1}$. The groups at 3740 cm.$^{-1}$ have also been observed with silica gel and amorphous silica-alumina catalyst and are not believed to be necessarily characteristic of faujasite. The two remaining intense bands, however, have not been observed on other solids and are only seen in the faujasite structure calcined in this manner. The hydroxyl groups at 3640 cm.$^{-1}$ interact with adsorbed hydrocarbons and must be in the accessible cage positions. On the other hand, those at 3550 cm.$^{-1}$ do not interact with adsorbed hydrocarbons and are believed to be in the isolated bridge positions not accessible to the hydrocarbons.

Figure 2:
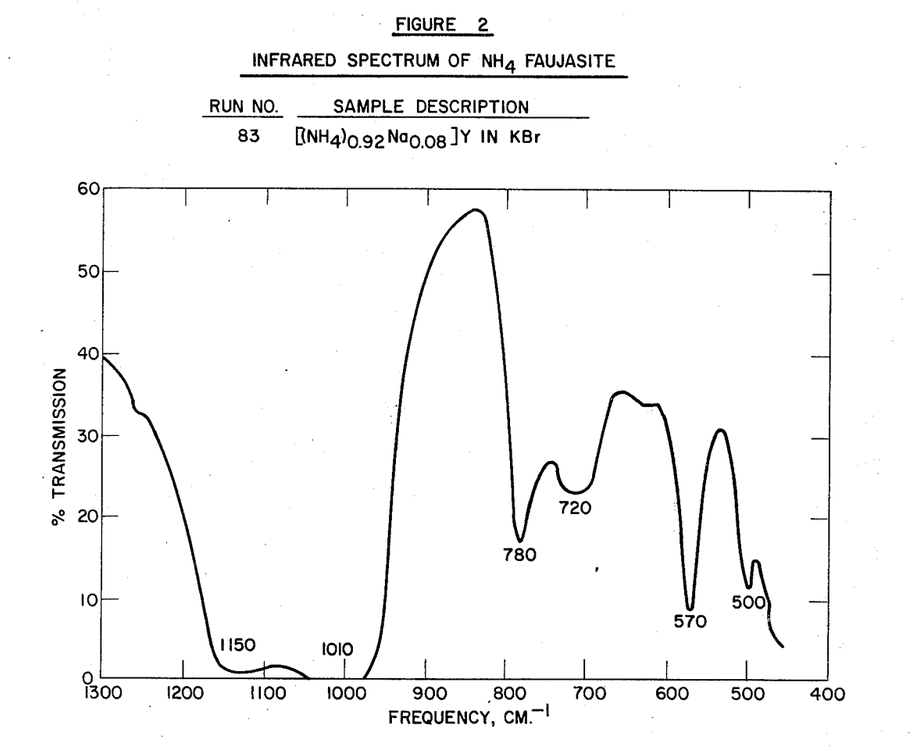

Vibrations of the crystal lattice are observed in the spectral region below 2000 cm.$^{-1}$. Spectra are shown in FIGURE 2 and the bottom curve of FIGURE 6 for the vacuum calcined sample. The position of these bands depends on the silica-alumina ratio of the faujasite. As the ratio increases, the bands shift to higher frequencies. See in this regard the work by W. Eitel, "Silicate Science," vol. I, pp. 20–43, Academic Press, New York, 1964.

The structure obtained by heat treatment under vacuum or dry air is not very stable. Crystallinity is gradually lost by further heating to 1200° F. This loss in structure is accompanied by commensurate loss in hydroxyl groups. In addition, the material is quite sensitive to rehydration. The structure can be destroyed by merely exposing the calcined sample to the atmosphere where water can be picked up at room temperature.

If $NH_4Y$ is heat treated in wet air (containing about 3.2% $H_2O$) at 1000° F. for 16 hours, a product results which has a considerably lower hydrogen content than that obtained by heat treatment in the absence of water. This is seen in FIGURE 1 by an overall reduction in intensity of the infrared bands due to hydroxyl groups. The number of characteristic —OH groups of faujasite at 3640 and 3550 cm.$^{-1}$ has greatly decreased. There is however, some indication that the number of groups at 3740 cm.$^{-1}$ has increased. The reasons for this are not clear but could be associated with the formation of a small amount of amorphous material.

Figure 3:
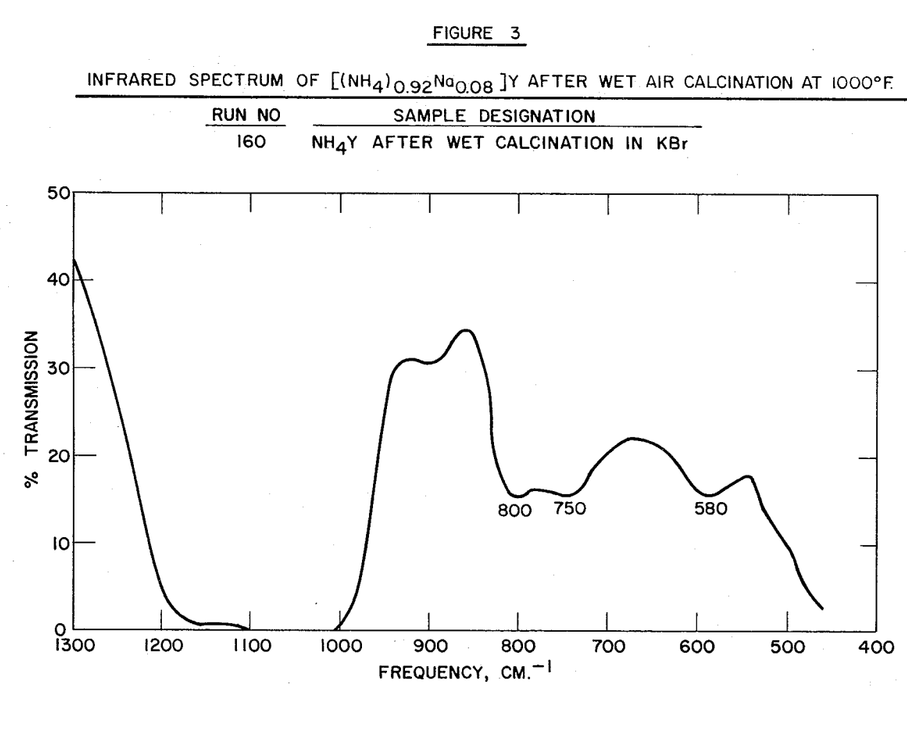

Concomitant with the overall hydrogen loss, a shift in the infrared frequencies of the crystal lattice vibrations has also occurred, as seen by comparing FIGURES 2 and 3. This shift to higher frequencies indicates that the silica-alumina ratio of the faujasite has increased as a result of partial removal of alumina from the structure.

Figure 4:
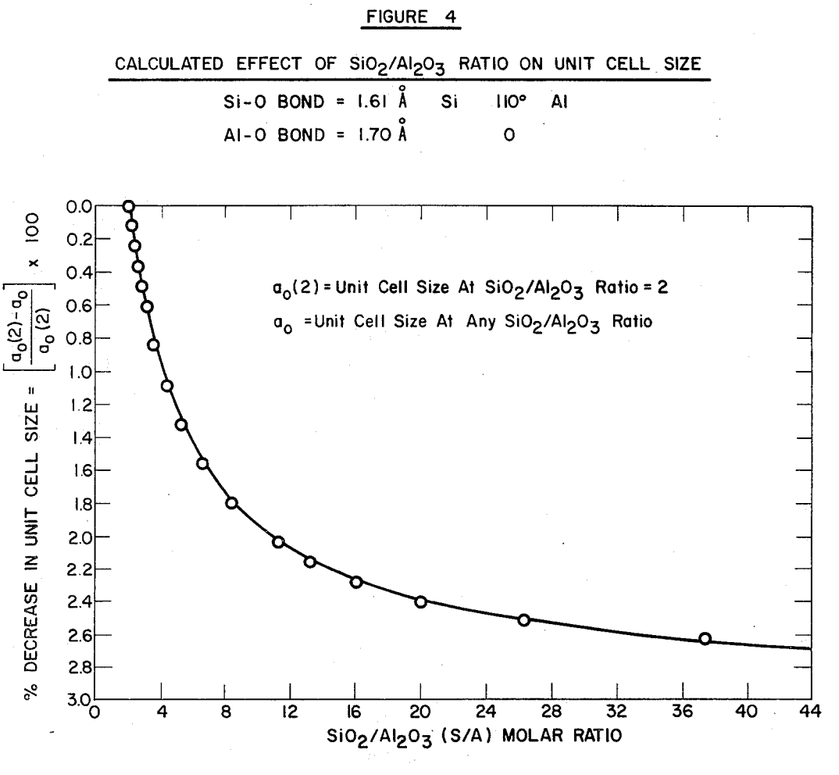

X-ray diffraction data on several samples before and after wet air calcination are listed in Table I. The values for the X-ray crystallinities are obtained by averaging the peak intensity of a number of diffraction lines. All the materials listed are considered to be well crystallized faujasites. The lower diffraction intensities of the K-containing forms can be accounted for by the potassium ions. In this table it is important to note the decrease in unit cell size which occurs on wet calcination. This decrease becomes more pronounced with increasing amount of ammonium-exchange and, moreover, is consistent with the theory that alumina has been partially removed from the faujasite. The length of the Si—O bond is shorter than that of the Al—O bond and consequently the cell size is expected to decrease with increasing amounts of silica in the lattice. The calculated magnitude of this effect is shown in FIGURE 4 where the percent decrease in unit cell size is plotted as a function of silica-alumina ratio. Thus, with a 92% $NH_4$ faujasite the cell size decrease upon wet calcination could mean an increase in the silica-alumina ratio from 4.7 to about 6.0.

TABLE I.—X-RAY CRYSTALLINITY AND UNIT CELL SIZES OF FAUJASITES AFTER WET AIR CALCINATION AT 1,000° F.

| Faujasite Sample | Initial | | After Wet Air Calcination at 1,000° F. | |
|---|---|---|---|---|
| | X-Ray Cryst., Percent | Unit Cell Size, A. | X-Ray Cryst., Percent | Unit Cell Size, A. |
| NaY | 238 | 24.66 | | |
| [(NH$_4$)$_{0.92}$Na$_{0.08}$]Y | 207 | 24.79 | 176 | 24.56 |
| [K$_{0.94}$Na$_{0.06}$]Y | 118 | 24.71 | | |
| [(NH$_4$)$_{0.56}$K$_{0.38}$Na$_{0.06}$]Y | 124 | 24.77 | 148 | 24.66 |
| [(NH$_4$)$_{0.84}$K$_{0.11}$Na$_{0.05}$]Y | 140 | 24.77 | 139 | 24.61 |
| [(NH$_4$)$_{0.91}$K$_{0.04}$Na$_{0.05}$]Y | 174 | 24.78 | 140 | 24.55 |

Thus, both the infrared, as well as diffraction data, indicate that alumina has been partially removed from the faujasite by wet air calcination. This partial removal lowers the number of protons needed to satisfy the negative electrical charges normally associated with alumina tetrahedra in the faujasite.

We turn now to the discussion of the structure obtained by a two-step calcination in which the material is first wet air calcined at 1000° F. for 16 hours and then steamed at 1200° F. and 1 atm. for an equal period of time. This final steam treatment serves to complete the reactions initially observed in the wet air calcination.

In FIGURE 1, the infrared spectrum of a 92% $NH_4Y$ sieve is shown after having been steamed at 1200° F. and is compared with spectra obtained by the other methods of calcination. The characteristic faujasite hydroxyl group bands at 3640 and 3550 cm.$^{-1}$ have been greatly reduced in intensity. Moreover, this loss of hydroxyl groups has occurred with very little loss in crystal structure since the material has a crystallinity value of 163% (see Table II). The band at 3740 cm.$^{-1}$, which could be associated with amorphous material in the faujasite, has been only slightly affected by the steaming process.

TABLE II.—PROPERTIES OF FAUJASITES AFTER CALCINING IN WET AIR AT 1,000° F. PLUS STEAMING AT 1,200° F.

| Faujasite Sample | SiO$_2$/Al$_2$O$_3$ Molar Ratio | X-Ray Cryst., Percent | Unit Cell Size, A. | Rel. Benzene[a] Ads. Capacity | Rel. H$_2$[a][b] Content |
|---|---|---|---|---|---|
| [(NH$_4$)$_{0.72}$Na$_{0.28}$]Y | 5.65 | 185 | | 60 | <10 |
| [(NH$_4$)$_{0.69}$Na$_{0.31}$]Y | 5.66 | 167 | 24.39 | | |
| [(NH$_4$)$_{0.56}$K$_{0.38}$Na$_{0.06}$]Y | 4.70 | 92 | 23.48 | | |
| [(NH$_4$)$_{0.84}$K$_{0.11}$Na$_{0.05}$]Y | 4.70 | 104 | 24.29 | | |
| [(NH$_4$)$_{0.91}$K$_{0.04}$Na$_{0.05}$]Y | 4.70 | 114 | 24.29 | 20 | 33 |
| [(NH$_4$)$_{0.92}$Na$_{0.08}$]Y | 4.70 | 163 | 24.32 | | |
| [(NH$_4$)$_{0.79}$Na$_{0.21}$]Y | 4.93 | 122 | | 18 | |

[a] Relative to that of acid-faujasite prepared by vacuum calcination at 800° F.
[b] Determined by deuterium exchange.

Figure 5:
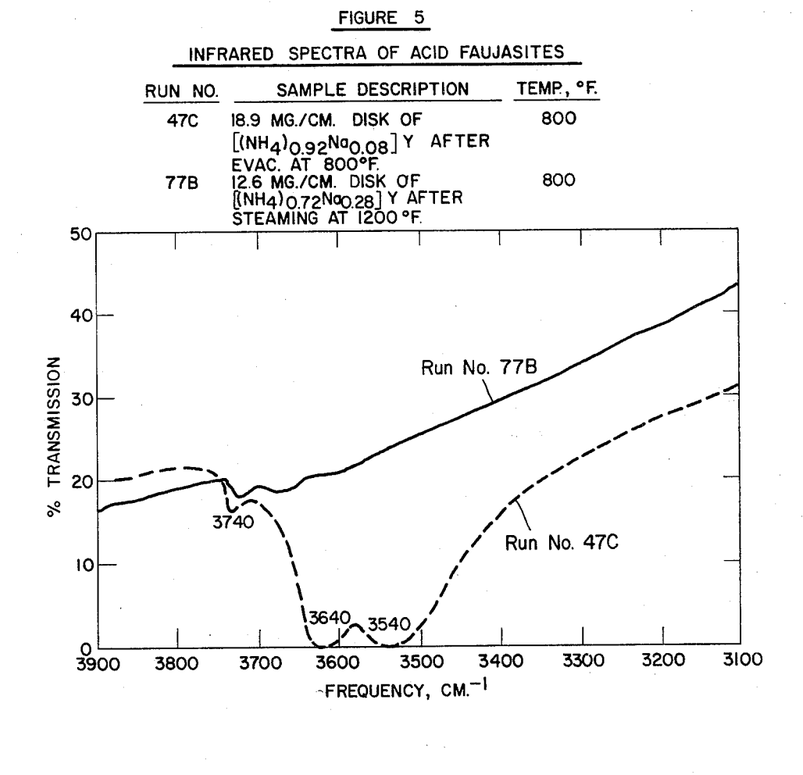

A more striking example of the effects of steaming is shown by the infrared spectra in FIGURE 5. The steamed sample was prepared from a 72% $NH_4Y$ sieve having a relatively high silica/alumina mole ratio of 5.65. The —OH bands have almost disappeared. Detailed data on this sample are given in Table II. The X-ray crystallinity value was 185% and benzene adsorption capacity was roughly 60% of that of the original vacuum calcined sample. This partial loss of capacity probably reflects the blocking of some of the pore structure by amorphous material. A more nearly quantitative measure of the hydrogen content of the steamed material was obtained by recording the increase in weight of the solid upon deuterim exchange. By this technique, the material was found to contain less than 10% of the number of protons theoretically necessary to satisfy the charge requirements of the original structure.

Figure 6:
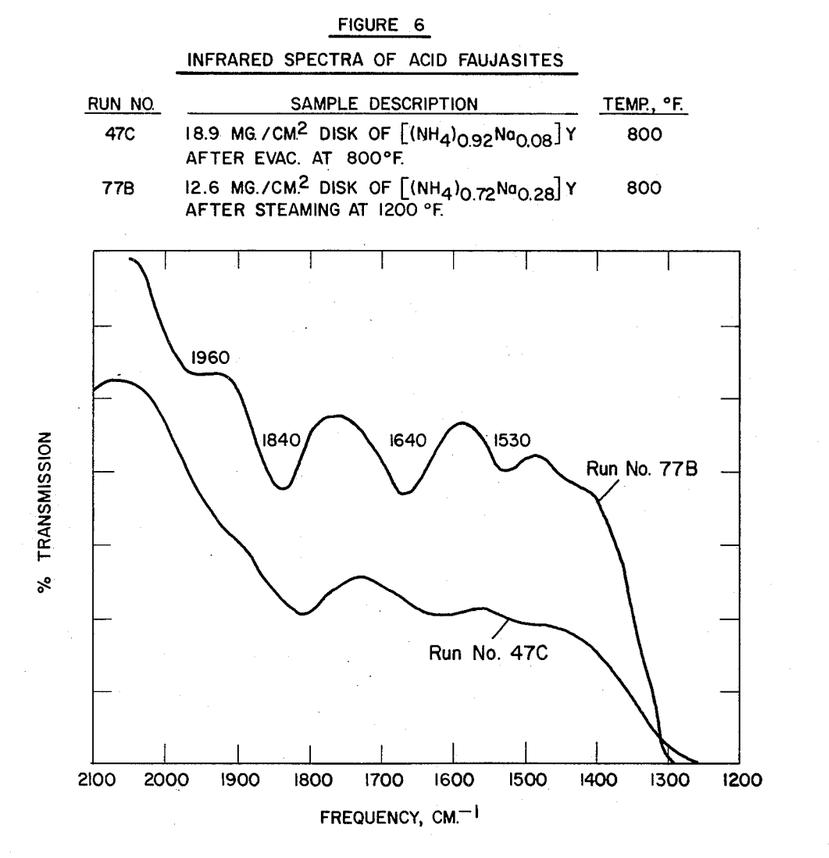

This loss of hydrogen causes definite changes in the structure of the crystal lattice as evidenced by shifts in the infrared lattice vibrations. Spectra in the region from 2100 to 1200 cm.$^{-1}$ are shown in FIGURE 6. Although the bands in this region cannot be assigned to specific group vibrations, they are known to be overtones of crystal lattice vibrations. In comparison to the vacuum calcined material, the steamed sample has very well defined bands in this region. These bands are frequently observed on high silica content materials. Furthermore, these bands occur at higher frequencies than their counterparts in the vacuum calcined material. The latter only exist as weak and rather broad bands.

Figure 7:
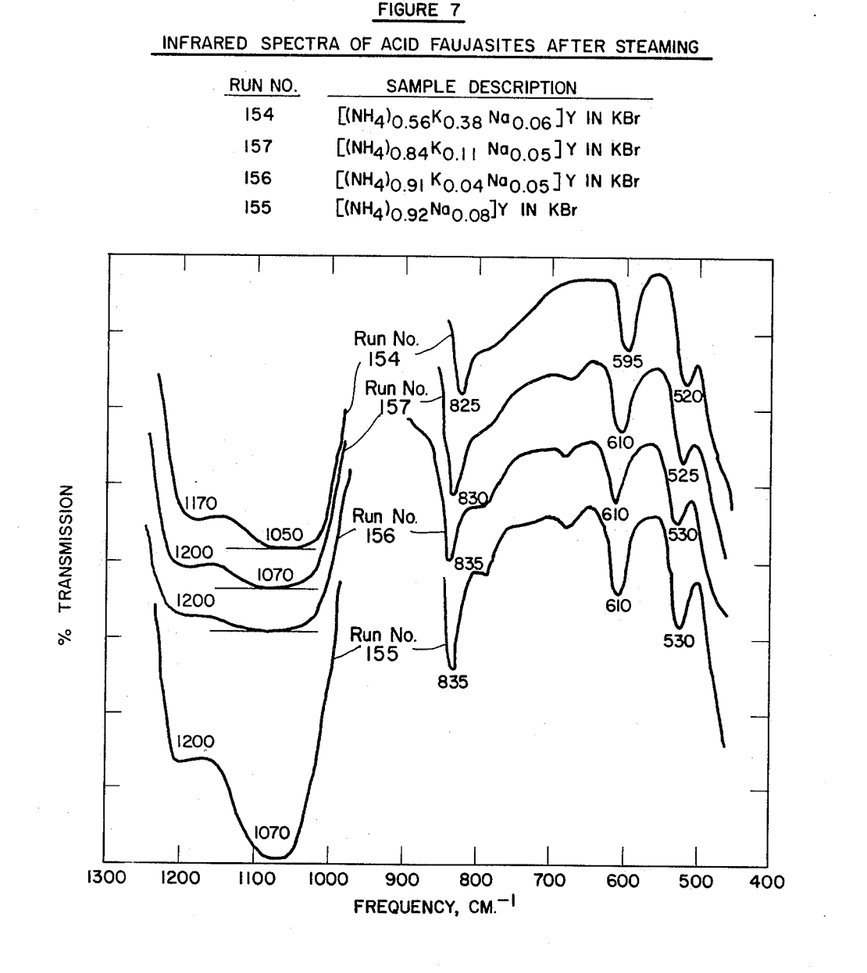

This shift in frequency of crystal lattice vibrations is more noticeable in the region below 1300 cm.$^{-1}$. Here, infrared spectra are best obtained by incorporating 1% of the sample in a matrix of KBr. Spectra of four steamed acid faujasite samples are shown in FIGURE 7. In comparing these curves with that obtained with the original material (FIGURE 2), we observe that every lattice vibration band has shifted to higher frequencies upon steaming. The magnitude of these shifts is much larger than that observed by wet air calcination alone (FIGURE 3) and indicates that the silica/alumina ratio of the faujasite has been increased to a correspondingly higher ratio.

Unit cell data, obtained by X-ray diffraction studies, are given in Table II. These are all lower than those of the wet air calcined samples and are, within experimental error values calculated for pure silica faujasite.

If, as indicated in the above discussion, the effect of steaming is to remove alumina from the faujasite structure, we would expect the alumina thus formed to be more readily attacked by chelating agents than alumina in the faujasite structure itself. Several extractions were made by refluxing with a tetraethyl ammonium hydroxide solution of ethylene diamine tetraacetic acid (EDTA) and the resulting data are given in Table III for both a fresh and steamed sample of $NH_4Y$.

TABLE III.—RESULTS OF ETHYLENE DIAMINE TETRAACETIC ACID (EDTA) EXTRACTIONS* ON $[(NH_4)_{0.92}Na_{0.08}]Y$

| Accumulative, Hrs. of Extraction | Not Calcined | | Wet Air at 1,000° F. plus 1,200° F. Steaming | |
|---|---|---|---|---|
| | X-Ray Cryst., Percent | $SiO_2/Al_2O_3$ | X-Ray Cryst., Percent | $SiO_2/Al_2O_3$ |
| 0 | 173 | 4.7 | 163 | 4.7 |
| 32 | 160 | 5.6 | 123 | 8.5 |
| 88 | 154 | 8.1 | 140 | 17.8 |
| 184 | 166 | 8.7 | 108 | 20.0 |

*3.5 grams faujasite treated with a solution of 4.8 grams EDTA in 17 ml. $N(Et)_4OH$ plus 15 ml. $H_2O$ at refluxing temperature.

The results show that alumina is indeed more easily removed from the steamed faujasite. After four extractions, the steamed material yielded a faujasite having the extemely high silica/alumina mole ratio of about 20. As indicated previously, it is extremely difficult by direct synthesis to make a faujasite with even a 6/1 silica to alumina mole ratio.

Figure 8:
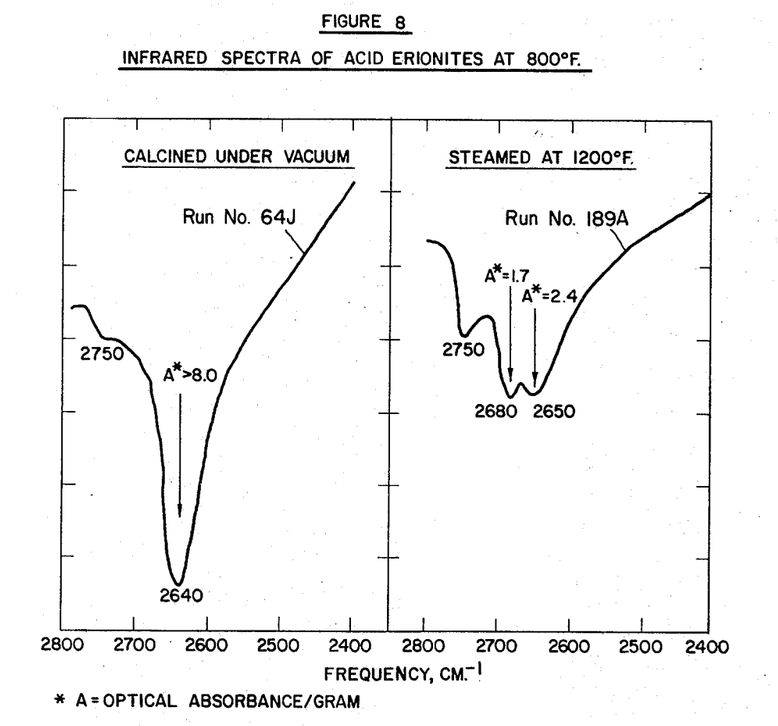
Figure 9:
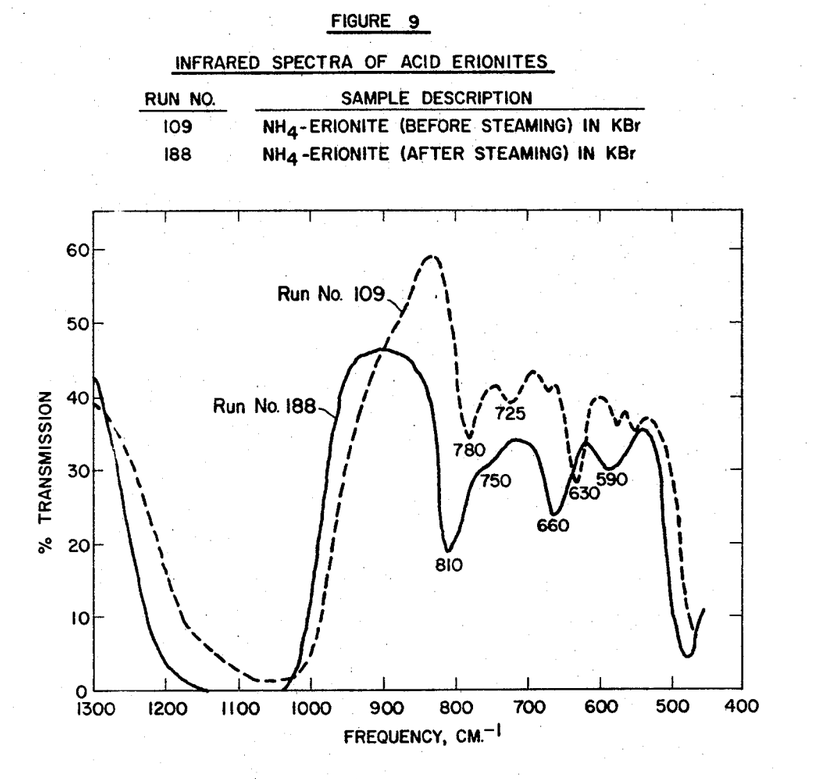

The process of the present invention is also effective in increasing the silica to alumina mole ratio in erionite. Erionite has rather poor transmission properties for infrared radiation, particularly in the hydroxyl group region. To obtain better spectra, the hydroxyl groups were transformed into their corresponding deuterium analogs by exchange with $D_2$ at 800° F. Infrared spectra in the —OD region are shown in FIGURE 8. In the vacuum calcined sample, a small peak appears at 2750 cm.$^{-1}$ which is the —OD analog of the —OH group at 3740 cm.$^{-1}$. This could be associated with a small amount of amorphous impurity in the zeolite. The intense band at 2640 cm.$^{-1}$ represents the characteristic —OD groups of erionite. After steaming, infrared absorption, as given by the absorbance (A) values, has greatly decreased in this characteristic region and two lower intensity bands can be resolved. At the present time, the exact significance of these two bands has not been fully established. With this loss of hydrogen upon steaming, the crystal lattice vibrations have all shifted to higher frequencies, as seen in the spectra of FIGURE 9. In addition the X-ray diffraction lines now occur at larger angles, indicating a decrease in lattice spacings and consequently a smaller unit cell size.

Since all these physical data indicate that alumina has been removed from the lattice structure by steaming, extraction experiments were done with hydrochloric acid in order to isolate high silica erionite. These results are listed in Table IV. The steaming process has improved erionite's acid resistance as reflected by the 42% crystallinity remaining after a one normal HCl treatment. The silica/alumina ratio was observed to have increased to a value of 29/1.

TABLE IV.—RESULTS OF HCl EXTRACTION* ON ERIONITE

| | Sample | | | |
|---|---|---|---|---|
| | Natural Erionite | | Synthetic Acid Erionite | |
| | Method of Calcination | | | |
| | Not Calcined | | Steamed at 1,200° F. | |
| | X-Ray Cryst., Percent | $SiO_2/Al_2O_3$ Ratio | X-Ray Cryst., Percent | $SiO_2/Al_2O_3$ Ratio |
| Initial | 100 | 7.3 | 108 | 7.9 |
| 1N HCl | 8 | | 42 | 29.0 |

*3 grams erionite treated with 30 ml. HCl solution for 16 hours at refluxing temperature.

High silica erionite of low cation content can also be made from ammonium erionite by steaming followed by a more dilute acid treatment. Data are given below in Table V for a steamed acid erionite before and after extraction with 0.1 N HCl.

TABLE V

| | Initial | After Extraction with 0.1 N HCl |
|---|---|---|
| Chemical Analysis, Wt. percent: | | |
| $Na_2O$ | 0.05 | 0.00 |
| $K_2O$ | 3.44 | 0.96 |
| $SiO_2$ | 77.57 | 92.28 |
| $Al_2O_3$ | 18.94 | 6.76 |
| $SiO_2/Al_2O_3$ Ratio | 6.9 | 23.0 |

Figure 10:
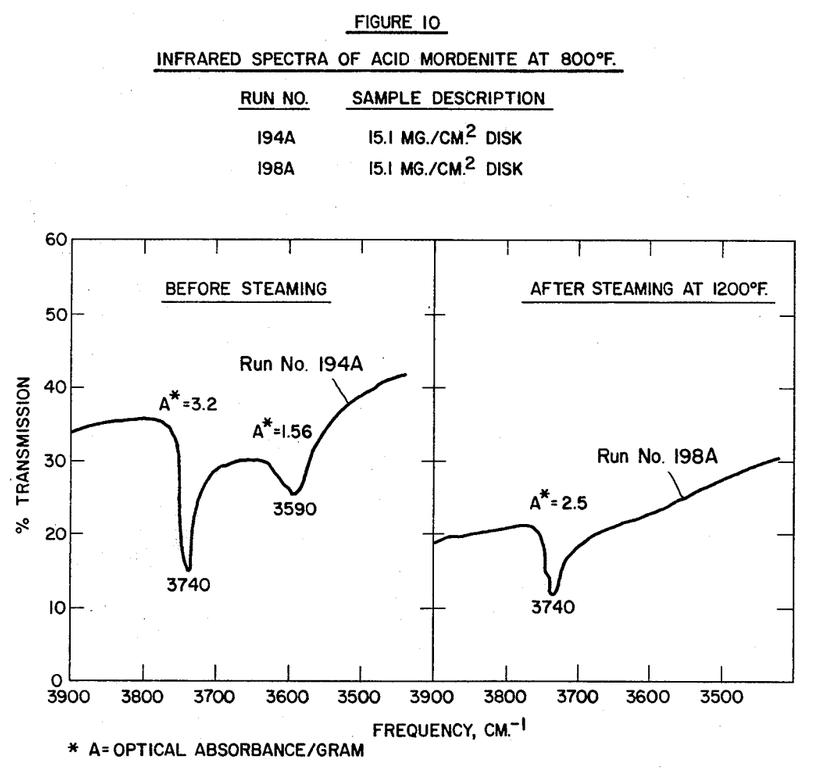
Figure 11:
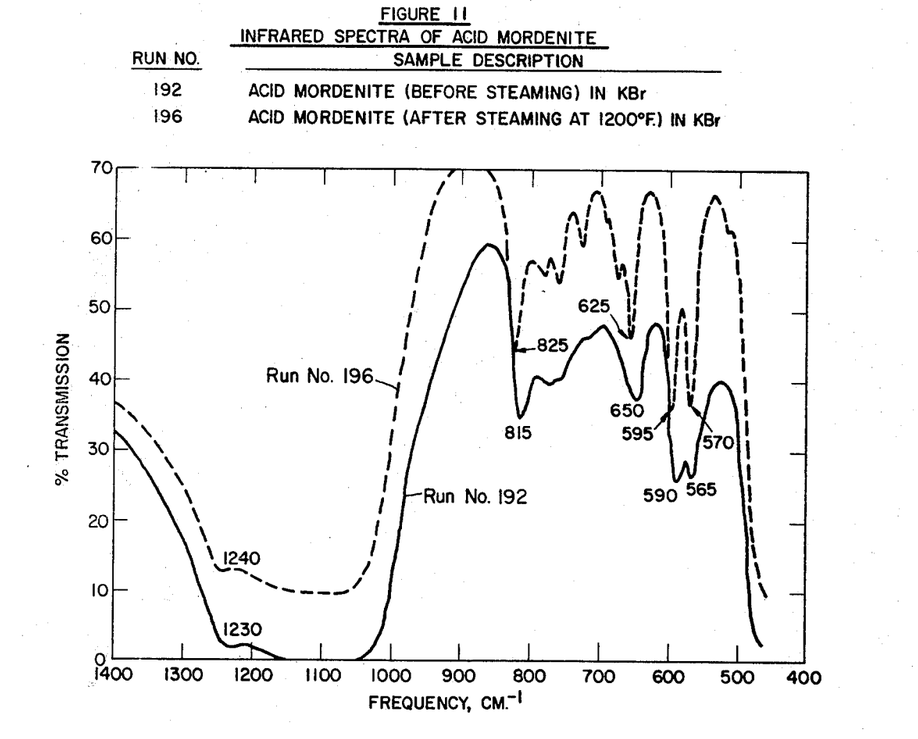

Mordenite is yet another example of a crystalline aluminosilicate zeolite molecular sieve which can be effectively treated by the process of the present invention in order to increase its silica to alumina mole ratio. Infrared spectra in FIGURE 10 show that the steamed sample contains very few of the characteristic —OH groups of mordenite which absorb at 3590 cm.$^{-1}$. Also, the bands due to lattice vibrations have all shifted to higher frequencies, as seen in FIGURE 11. At the same time, the crystallographic $d$ spacings have decreased, indicating a smaller unit cell. These facts, which are completely analogous to those of faujasite and erionite, prove that alumina has been removed from the structure by steaming.

It is, therefore, evident that the process of the present invention involves the following procedural steps: (1) ion exchange of a crystalline aluminosilicate zeolite to prepare the H+ or $NH_4$ form; (2) heat treatment of the acid form of the zeolite in the critical presence of water (preferably steam) at elevated temperatures; and (3) leaching of extraneous alumina from the product of (2) by treating with dilute acid or some chelating agent selective for alumina. Step (2) may, of course, involve a two-part procedure wherein the acid molecular sieve is treated with wet air at a moderately elevated temperature and is then treated with steam at a still more elevated temperature. It is also understood that the resulting product of the process would preferably undergo a drying and/or calcining procedure prior to its use as an adsorbent or catalyst.

The process of the present invention will be still more clearly understood by reference to the following examples which are advanced for the purposes of illustration only and should not be taken as limiting the scope of the present invention in any way.

EXAMPLE 1

This example demonstrates the critical nature of each of the process steps of the present invention. Sodium fuajasites having silica to alumina mole ratios of from 5 to 6 were subjected to varying degrees of base exchange with ammonium ions. The resulting faujasites were then subjected to one or more of the following process steps including calcination (in a muffle furnace with ambient air containing about 2% $H_2O$), steaming at a pressure of about 1 atm., and acid extraction with a sulfonic acid type cation exchange resin; 6 cc. acid regenerated resin/ g. zeolite in water slurry at 100° C. for 4 hours. The qualitative effects of these process steps, taken singly or in various combinations, were determined by examination of the comparative crystallinity and the unit cell size of the product. X-ray crystallinity is calculated by summing the observed amplitudes of the 10 strongest lines of the faujasite pattern in arbitrary scalar units subtracting background intensity and dividing this sum by the corresponding sum for the laboratory standard known to be a good crystalline faujasite. The quotient expressed as percent is reported as X-ray crystallinity; the laboratory standard has been arbitrarily assigned a crystallinity of 100%.

The results of these experiments are tabulated in Table VI given below.

TABLE VI

| Experiment | $SiO_2/Al_2O_3$ | $NH_4$ Exch. | Calcination | Steaming | Acid Extraction | Cryst. | A. |
|---|---|---|---|---|---|---|---|
| 0 | 5 | 6 | None | None | None | 188 | 24.71 |
| 1 | 5 | 6 | 1,000° F., 16 Hr | do | do | 82 | 24.59 |
| 2 | 5 | 6 | 1,000° F., 16 Hr | 800° F., 16 Hr | do | 88 | 24.46 |
| 3 | 5 | 6 | 1,000° F., 16 Hr | 1,000° F., 16 Hr | do | 56 | 24.39 |
| 4 | 5 | 6 | 1,000° F., 16 Hr | 1,200° F., 16 Hr | do | 67 | 24.35 |
| 5 | 5 | 6 | 1,000° F., 16 Hr | 1,200° F., 16 Hr | Yes | 90 | 24.28 |
| 6 | 5 | 6 | None | 800° F., 16 Hr | None | 92 | 24.50 |
| 7 | 5 | 6 | do | 800° F., 16 Hr | Yes | 130 | 24.44 |
| 8 | 5 | 6 | do | 800° F., 4 Hr | None | 128 | 24.55 |
| 9 | 5 | 1 | do | 1,000° F., 16 Hr | do | 207 | 24.67 |
| 10 | 5 | 6 | do | 1,000° F., 16 Hr | do | 129 | 24.44 |
| 10A | 6 | 3 | do | None | do | 178 | 24.61 |
| 11 | 6 | 3 | do | do | Yes | 8 |  |
| 12 | 6 | 3 | 1,000° F., 16 Hr | 1,200° F., 16 Hr | Yes | 203 | 24.37 |
| 13 | 5 | 6 | None | None | Yes | 0 |  |

Examination of the above data indicates the following critical points. In the first place, it is clearly evident that acid extraction alone will destroy the crystallinity of the faujasite sample, even one having as high an initial silica to alumina mole ratio as 6 to 1 (Experiments 11 and 13). Calcination at 1000° F. for 16 hours alone is seen to produce some small removal of alumina from the acid faujasite as indicated by the somewhat smaller unit cell size produced (Experiment 1). However, steaming alone at temperatures of 800° F., 1000° F. and 1200° F. is more effective than calcination alone as evidenced by a greater degree of reduction in the unit cell size and additionally by a superior retention of crystallinity in the product (Experiments 6, 8 and 10). The results of Experiment 9 indicate that the degree of ammonium exchange is important in alumina extraction since a single exchange with ammonia followed by steaming at 1000° F. for 16 hours produced a material exhibiting a unit cell size which is virtually unchanged from the starting material thereby indicating an absence of effective alumina removal. It is further evident that the experiments utilizing the process steps of the present invention. Experiments 5, 7 and 12, wherein the acid faujasite is treated with a calcination and/or steaming step prior to acid extraction yield a product having the lowest order of unit cell size while at the same time maintaining or even enhancing the degree of crystallinity in the product material.

EXAMPLE 2

This example shows the improvement in activity and selectively in catalytic reactions exhibited by crystalline aluminosilicate zeolite molecular sieves treated by the process of the present invention. In this example, a faujasite treated as per Experiment 12 from Example 1 was tested for cracking activity in a 95% silica-alumina matrix (13% $Al_2O_3$) after steam deactivation at 1500° F. The results are tabulated below in Table VII and compared to a standard catalyst consisting of 5% regular H-faujasite in the same silica-alumina matrix and after the same 1500° F. steam deactivation.

TABLE VII
[500–700° F. E. Texas G.O., 950° F., 2-Minute Cycle, 60% Conversion]

| Catalyst (1,500° F. Steamed) | Untreated H Faujasite | Experiment #12 Faujasite |
|---|---|---|
| W./Hr./W | 2.5 | 3.5 |
| Carbon, Wt. percent | 1.0 | 0.7 |
| $C_3$– Gas, Wt. percent | 7.8 | 7.6 |
| Total $C_4$, Wt. percent | 10.9 | 11.1 |
| $C_5$/430° F., Wt. percent | 40.3 | 40.6 |
| $C_3H_6$, Wt. percent | 5.4 | 5.3 |
| $C_4H_8$, Wt. percent | 5.6 | 7.5 |

The higher activity of the treated catalyst indicated by higher w./hr./w. for 60% conversion is believed due to the better stability arising from the higher silica to alumina mole ratio of this catalyst (about 15/1 versus about 5/1 in the untreated faujasite). The improved selectivity of the treated catalyst is evidenced by the lower carbon make and somewhat higher yield of gasoline fraction.

EXAMPLE 3

This example illustrates the preparation of a new composition of matter consisting of a pure silica faujasite, i.e., a crystalline material exhibiting the X-ray diffraction pattern of faujasite but containing no alumina tetrahedra and additionally no metal cations since the silica lattice is essentially electronically neutral. A good crystalline sodium faujasite having $SiO_2/Al_2O_3 \geq 6.0$ is exchanged to the ammonium form. Residual $Na_2O$ content should be 2.0% or less. This material is steamed at 1400° F. in one atm. steam for 24 hours. The resulting steam-modified zeolite is extracted with 0.1 N HCl at 100° C.; the amount of acid should be sufficient to give a final pH equal to 2 or less. The washed and dried product by weight consists of a crystalline polysilicate having an X-ray diffraction pattern of faujasite but which is essentially free of $Al_2O_3$ and $Na_2O$. The cell size of this polysilicate faujasite is about 24.2 A. (within experimental error).

EXAMPLE 4

A sample of large-pore mordenite (Zeolon-Na supplied by Norton Company) is exchanged to the $NH_4^+$ form by repeated treatments with 10% $NH_4NO_3$ solution at 180° F. The washed and dried product is steamed at 1400° F., 1 atm. steam for 24 hours. The steam-modified zeolite is extracted with 0.1 N HCl until the pH is less than 2.0. The washed and dried product consists of a crystalline polysilicate having an X-ray diffraction pattern of mordenite but which is essentially free of $Al_2O_3$ and $Na_2O$. The unit cell dimensions of the polysilicate mordenite within experimental error are about the following: $a_0 = 17.98$ A.; $b_0 = 20.33$ A.; $c_0 = 7.46$ A. (orthorhombic unit cell).

EXAMPLE 5

A sample of synthetic (K, Na)-erionite having $SiO_2/Al_2O_3 = 6.0$ was exchanged five times with 10% $NH_4NO_3$ solution at 180° F. The product contained 0.1% $Na_2O$ and 5.0% $K_2O$. This material was steamed at 1000° F. in 1 atm. steam for 16 hours then extracted with the acid form of a cation exchange resin as described in Example 1. The washed and dried product gave $SiO_2/Al_2O_3 > 20$ by analysis, no detectible residual $Na_2O$ and less than 1% residual $K_2O$. The product shows 43% of the original X-ray crystallinity but the cell size $a_0$ for the hexagonal unit cell had decreased from 13.20 to 13.13 A.

EXAMPLE 6

The procedure of Example 5 is utilized to produce a crystalline polysilicate having the X-ray diffraction pattern of erionite which is essentially free of $Al_2O_3$, $Na_2O$ and $K_2O$. This material exhibits unit cell dimensions which within experimental error are as follows:

$a_0 = 13.09$ A.; $c_0 = 14.92$ A. (hexagonal unit cell)

It is evident that the process of the present invention can be extended so as to produce crystalline zeolites having extremely high silica to alumina mole ratios and which have been further modified by impregnation with selected metal ions or compounds so as to produce specifically desirable compounds as catalysts for selected reactions. For example, it is within the scope of the present invention to impregnate the product of the present inventive process with such metal cations as silver, calcium, beryllium, barium, magnesium, zinc, aluminum, titanium, zirconium, chromium, iron, manganese, cerium, the rare earth metals, platinum, palladium, and mixtures thereof. It is also possible to form composites of the high silica to alumina mole ratio crystalline molecular sieves with catalytically active compounds of molybdenum, tungsten, palladium, platinum, etc. by impregnation. Other variations in the process and products of the present invention will be evident to one skilled in the art.

What is claimed is:

1. An improved process for increasing the silica/alumina mole ratio in the crystal lattice of a crystalline aluminosilicate zeolite of the molecular sieve type, which molecular sieve is at least partially in its hydrogen form, said process comprising in combination:
    (1) treating said molecular sieve at an elevated temperature within the range of about 800 to 1500° F. in an atmosphere containing at least 2% water for a period of time sufficient to effect removal of at least some alumina tetrahedra from said molecular sieve crystal lattice, said alumina forming an amorphous phase in said molecular sieve; and then
    (2) contacting the thus treated molecular sieve with an agent, selected from the group consisting of the dilute mineral acids and the organic acid chelating agents, selective for the removal of alumina, whereby an aluminosilicate zeolite molecular sieve is obtained having an enhanced silica/alumina mole ratio with at least substantial retention of the degree of crystallinity of said molecular sieve.

2. The process of claim 1 wherein said treating step (1) comprises a two stage procedure comprising:
    (1) contacting said molecular sieve with atmosphere containing at least 2% water at a temperature in the range from about 650° F. to about 1200° F.; and
    (2) then contacting said molecular sieve with steam to about 1500° F.

3. The process of claim 1 wherein said agent selective for the removal of alumina is a dilute mineral acid.

4. The process of claim 1 wherein said agent selective for the removal of alumina is an organic acid chelating agent.

5. The process of claim 1 wherein said molecular sieve is selected from the group consisting of faujasite, mordenite and erionite.

6. The process of claim 1 wherein said molecular sieve has an initial silica to alumina mole ratio less than 3/1.

7. A new composition of matter consisting of a crystalline polysilicate having an X-ray diffraction pattern essentially that of faujasite and further exhibiting a crystal unit cell size of about 24.2 A.

8. A new composition of matter consisting of a crystalline polysilicate having an X-ray diffraction pattern essentially that of mordenite and further exhibiting an orthorhombic crystal unit cell having dimensions in Angstrom units of about $a_o=17.98$, $b_o=20.33$ and $c_o=7.46$.

9. A new composition of matter consisting of a crystalline polysilicate having an X-ray diffraction pattern essentially that of erionite and further exhibiting a hexagonal crystal unit cell having dimensions in Angstrom units of about $a_o=13.09$ and $c_o=14.92$.

10. The process of claim 1 wherein the treating step is accomplished in an atmosphere containing at least 5% water.

11. The process of claim 1 wherein the treating step is accomplished in an atmosphere containing at least 25% water.

References Cited

UNITED STATES PATENTS 3,140,249   7/1964   Plank et al. _______ 252—455 X
3,293,192   12/1966   Maher et al. _______ 23—111 X

OTHER REFERENCES

Azaroff et al., The Powder Method in X-Ray Crystallography, McGraw-Hill Book Co. (1958), p. 181.

Bunn, Chemical Crystallography, 2nd ed., Oxford University Press (1961), pp. 8–9.

EDWARD J. MEROS, Primary Examiner